United States Patent [19]

Gravel

[11] 4,128,752
[45] Dec. 5, 1978

[54] LASER MICROMACHINING APPARATUS

[75] Inventor: Joseph A. M. Gravel, Quebec, Canada

[73] Assignee: Her Majesty the Queen in right of Canada, as represented by the Minister of National Defence, Ottawa, Canada

[21] Appl. No.: 750,898

[22] Filed: Dec. 15, 1976

[51] Int. Cl.² .............................................. B23K 9/00
[52] U.S. Cl. .................................................. 219/121 L
[58] Field of Search ...................... 219/121 L, 121 LM

[56] References Cited

U.S. PATENT DOCUMENTS

| | | | |
|---|---|---|---|
| 3,156,810 | 11/1964 | Samuelson | 219/121 L |
| 3,266,393 | 8/1966 | Chitoyat | 219/121 L |
| 3,588,439 | 6/1971 | Heller et al. | 219/121 L |
| 3,778,585 | 12/1973 | Mallozzi et al. | 219/121 LM |

OTHER PUBLICATIONS

IBM Disclosure Bulletin vol. 13 No. 10 Mar. 1971 Kawecki.

*Primary Examiner*—J. V. Truhe
*Assistant Examiner*—Fred E. Bell
*Attorney, Agent, or Firm*—Nathan Edelberg; Sheldon Kanars; Edward Goldberg

[57] ABSTRACT

Laser micromachining apparatus for producing a selectable machining pattern on a workpiece, for example a substrate of paper or rubber or for producing a silicon integrated circuit. A high power laser beam carrying a controllable sequence of light pulses passes through a variable attenuator unit and then through a beam expander unit before impinging on a mask containing an enlarged pattern of the mark to be machined. The pattern in the mask consists of a suitable arrangement of small apertures. After diffraction through these apertures and focalization by a converging optical element, the laser light passes through an optical imaging unit which images the mask onto the workpiece to produce said selectable machining pattern thereon.

10 Claims, 1 Drawing Figure

LASER MICROMACHINING APPARATUS

BACKGROUND OF THE INVENTION

This invention relates to laser micromachining apparatus.

Several methods of micromachining substrates have previously been proposed or utilized — see "Review of Laser Microwelding and Micromachining" (K. G. Nichols) — PROC IEE Vol. 116 No. 12 Dec. 1969. They fall into several groups, the first being mechanical methods using needles, ultrasonic drills, or a jet of fluid or small particles. Such mechanical methods have generally been found to be time-consuming and not capable of very fine and clean machining. Furthermore, they appear to be often limited to a particular class of materials.

Electrical methods utilizing electron beam or electrical spark apparatus have also been used. The electron beam has been found to be very fast and very accurate, but the technique has, in practice, proved to be very involved and expensive, the substrate having to be mounted in a vacuum and only one point being processed at a time. On the other hand, the electrical spark apparatus is not very involved and is not expensive but does appear to be very limited in its scope and not capable of wide use.

Chemical methods have been used and these are very accurate and not too expensive but they do require several operations and are time-consuming in practice. Electrodeposition methods require a conducting surface to start with whilst the depth of penetration which is obtainable by etching cannot generally exceed the width of the cut on the surface, due to the inherent V-shape of the cut. Moreover, it would appear that certain substrates, such as paper and rubber, cannot be etched properly.

A focussed laser beam has previously been used and has been found capable of working on a wide variety of materials. However, most existing systems operate on only one point at a time.

It is an object of the present invention to provide laser micromachining apparatus in which the above-mentioned disadvantages are substantially reduced or obviated and wherein the apparatus is capable of working on a relatively wide variety of substrates and on a large number of points simultaneously, whilst maintaining a high resolution and a high production rate where possible.

SUMMARY OF THE INVENTION

Accordingly, the present invention provides laser micromachining apparatus capable of producing a particular machining pattern on a workpiece comprising a laser device for producing a laser beam, a mask device in the laser beam's path and having a diffraction masking pattern corresponding to said particular machining pattern, means for causing the laser beam to impinge on the whole of said masking pattern in said mask device, and means in the path of said laser beam path after said mask device for imaging said pattern onto said workpiece whereby said pattern is reproduced on said workpiece. Means may be provided to protect the last optical element against materials ejected from said workpiece during machining.

BRIEF DESCRIPTION OF THE DRAWING

An embodiment of the present invention will now be described, by way of example, with reference to the single FIG. 1 of the accompanying drawings which diagrammatically illustrates the arrangement of apparatus according to the present invention.

DESCRIPTION OF PREFERRED EMBODIMENT

Figure 1:
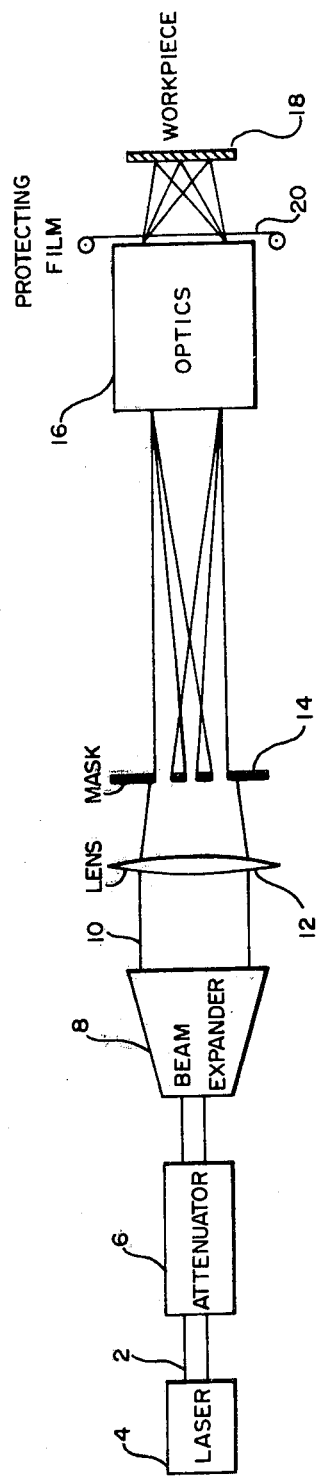

Referring to FIG. 1, it will be seen that the laser micromachining apparatus comprises a number of units. An intense laser beam 2 is produced in a high power laser unit 4. This unit includes a double discharge TEA-$CO_2$ laser of the Laflamme type which radiates at a wavelength of 10.6 microns in the form of brief pulses. It is arranged that an arbitrary sequence of high power laser pulses can be produced at a pulsing rate adjustable up to fifteen pulses per second and each pulse delivers an energy of 7 joules in 200 nanoseconds. The cross-section of the beam 2 was rectangular and measured 2.5 × 7.5 centimeters.

The power level of the laser beam 2 is controlled by passing it through a variable attenuator unit 6 which consists of a cell which is first evacuated and then partially filled with propylene whose pressure controls the attenuation of the laser beam passing through it. The cell measures one foot in length and is terminated by two NaCl windows. After passing through the attenuator unit 6 the beam is expanded and shaped in a beam expander unit 8 so as to provide an emerging beam 10 capable of providing uniform illumination over a larger area. The beam expander unit 8 comprises two cylindrical NaCl lenses mounted one meter apart and it transforms the beam from 2.5 × 7.5 cm to a beam cross-sectional area of 7.5 × 7.5 cm. The first lens in the beam expander unit 8 is a diverging lens with a focal length of −50 cm, whilst the second lens in the beam expander unit 8 is a converging lens with a focal length of 1.5 meters. However, other types of cylindrical lenses or a set of cylindrical mirrors having a high reflectivity can also be used to provide an appropriate beam expander.

The expanded and shaped laser beam 10 is passed through a converging lens 12 which, in one embodiment, was a spherical NaCl lens with a focal length of 36 inches. In another embodiment the lens 12 had a focal length of 30 inches and was mounted immediately behind the mask 14. The lens 12 was located 6 inches from the beam expander unit 8 and 6 inches from a mask 14 through which the beam 10 passed after focussing by the converging lens 12. The mask 14 was provided with a number of perforations according to the pattern to be machined on a substrate or sample. The perforations consisted of an ensemble of small holes and thin lines which diffracted the laser light beam 10 and acted as discrete sources for the subsequent imaging optics unit 16.

The mask 14 was made of a thin spherical cap of brass having a radius of curvature of 75 cm, a thickness of 1 mm and a diameter of 6 cm. The curvature of that mask 14 matched the incident wavefront of laser light and had its center located in the entrance pupil of the imaging optics unit 16.

The patterns required on the workpieces were made in the mask at a magnification factor of 18, using circular holes 0.5 mm in diameter and straight or curved lines 0.5 mm in width. A spacing larger than 0.7 mm between the edges of adjacent holes or lines could clearly be resolved by the imaging system or unit 16. However, it was found that unresolved spacings smaller than 0.3 mm could be used effectively to machine large continuous areas on the workpiece 18.

The imaging optics unit 16 consists of two germanium lenses which image the mask 14 onto the workpiece with a magnification factor of 1/18. These lenses were specially designed converging meniscus with both surfaces coated with anti-reflection films. The first lens had a diameter of 5 cm, a thickness of 0.406 mm and a radii of curvature of 11.4 and 15.9 cm. The second lens had a diameter of 3.3 cm, a thickness of 0.456 mm and a radii of curvature of 2.91 and 4.15 cm. The separation between the two lenses was 8.36 and the first lens was positioned at 75 cm behind, i.e. from, the mask 14. In the embodiment constructed, the size of the image on the workpiece 18 was 3 × 3 mm and the depth of focus of the optical imaging unit was about 150 micrometers.

From the above it will be seen that the converging lens 12 is effective to superpose the diffraction pattern of the individual perforations of the mask 14 at the entrance pupil of the imaging optics 16, so enabling the use of minimum size lenses, reducing the volume, weight and cost of the micromachining head. As explained, the imaging optics unit 16 can include several lenses and is designed to reduce the pattern of perforations to the size wanted without distortion. In some cases, catadioptric mirrors having a high reflectivity can be substituted for the lenses, or lenses of different materials can be used.

The workpiece 18 is carefully mounted in the image plane of the optics unit 16 by way of a micropositioner (not shown). In the embodiment constructed, that plane was approximately located at a distance of 1.2 cm behind the last lens of the optical imaging unit 16. The micropositioner was a conventional micropositioner with three axes of freedom and was used to mount the workpiece 18 accurately in the image plane of the imaging optics unit 16. The accuracy of positioning on each axis was ∓5 microns.

In order to protect the lenses of the optics unit 16 from debris coming off the workpiece 18 during the micromachining operation, a transparent film 20 was mounted between the workpiece 18 and the imaging optics unit 16, at approximately 1 mm from the latter. The film 20 was of CAPTON (Trade Mark), 12.5 micron thick and 5 cm wide. It was effective to protect the second germanium lens of the imaging optics unit 16 against the products of vaporization from the workpiece 18. The overall transmission of the film 20 at 10.6 microns was about 71%. In order to prevent the film transmission from being reduced by the products of vaporization that deposited on the film surface, the said film was provided in the form of a ribbon that moved in front of the last lens at a speed matching the machining rate. In one embodiment a jet of inert gas was also used to sweep the debris out of the way and a small aspirator was used to eliminate them. In one embodiment, a viewing microscope (not shown) having a magnification factor of 150 times was used to observe parts of the workpiece being machined. This microscope was mounted behind the workpiece and could be used when the latter was transparent, such as glass or clear plastics, or when it was opaque but thin and that the said pattern needed to be machined right through. The sample or substrate 18 was, in some instances, a sheet of paper.

In use, the apparatus is set up with applicable voltage supplies, etc. and the workpiece 18 is placed in position. The appropriate mask 14 is selected and placed in its proper position as diagrammatically illustrated in FIG. 1. It will be appreciated that this mask 14 can readily be removed and replaced by one of a plurality of such masks so as to produce any desired pattern on the sample. After positioning the mask 14 and other units, the apparatus is switched on and normal procedures are applied whereby the desired pattern is produced on the workpiece or sample 18.

From the above, it will be seen that the described embodiment of the invention couples a high power laser with a special imaging technique which takes advantage of the diffraction phenomenon of light waves. In use this is found to lead to machining with a resolution comparable to the wavelength of the radiation used. Many points on the workpiece 18 were, as explained, machined simultaneously and the apparatus was virtually a zero wearing tool. The design concept prevented the mask 14 and the imaging lenses from being damaged by the intense laser beam or by the material removed from the workpiece 18, whilst maintaining the size of the micromachining head at a minimum.

It will be appreciated that an infinite variety of patterns involving small holes and fine lines can be machined according to the described embodiment of the invention. The technique appears to be particularly suitable for making simultaneously a large number of identical holes, for an iris can be introduced in the entrance pupil of the imaging system to cut out the diffraction rings and further increase the resolution on the workpiece 18. Large holes and large lines can also be made by covering the corresponding areas of the mask 14 by a dense grid of small holes, too close to be resolved by the imaging system.

It will be appreciated that, in some applications, for example when a uniform array of small holes or when large continuous areas need to be machined, the fraction of energy intercepted by the diffracting mask 14 can be considerably reduced by replacing the said mask in whole or in part, by a two-dimensional array of small, adjacent, square converging lenses having a focal spot size equal to the original mask perforations. That way, the laser energy that would normally be stopped by the mask 14 is not lost but collected by the small lenses and effectively diffracted towards the optical imaging unit 16.

From the above description it clearly appears that the elimination of the converging lens 12 from the system would necessitate the use of much wider optical elements in the imaging unit 16 to collect all the laser light diffracted by the mask 14. However, if such wider optical elements could be tolerated, and if the laser energy density required to machine the workpiece 20 remained below the damage threshold of said wider optical elements of said imaging unit, then the machined pattern in the diffracting mask 14 would not need to be made of an ensemble of very small holes. Indeed, holes of any size would become acceptable in the mask, but the micromachining head would be bulky.

It will also be appreciated that the apparatus can be used to work on any solid material and the number of laser pulses and the energy level per pulse can be adjusted to control the depth of penetration.

The apparatus would appear to be suitable for line production and in many applications the work can be performed as the sample passes by.

It will also be appreciated that the mask 14 can be interchanged rapidly and the apparatus appears to have a high potential in industrial applications such as microwelding, scribing, trimming, and etching, particularly due to its ease of operation.

It will furthermore be appreciated that the apparatus can be provided with a set of numerical and alphabetical masks, coupled to the keys of a conventional typewriter, to engrave permanent numbers or codes or notes on a wide variety of articles.

To ensure a minimum size imaging unit the converging spherical lens may be located in the vicinity of the mask, either before or after it, and this is used to superpose, in the entrance pupil of the optical imaging unit, the diffraction patterns of the different perforations in the mask.

From the above it will be seen that there is provided laser micromachining apparatus for producing a selectable machining pattern on a workpiece, for example a substrate of paper or rubber or for producing a silicon integrated circuit. A high power laser beam carrying a controllable sequence of light pulses passes through a variable attenuator unit and then through a beam expander unit before impinging on a mask containing an enlarged pattern of the mark to be machined. The pattern in the mask consists of a suitable arrangement of small apertures. After diffraction through these apertures and focalisation by a converging optical element, the laser light passes through an optical imaging unit which images the mask onto the workpiece to produce said selectable machining pattern thereon.

In the described embodiment a high power laser beam is produced by a double discharge TEA-$CO_2$ laser of the Laflamme type. The laser beam passes through a variable attenuator unit and then through a beam expander unit comprising two cylindrical NaCl lenses mounted one meter apart wherein the beam is transformed to be 7.5 cm × 7.5 cm in cross-section. After passing through a converging lens the beam impinges on a diffraction mask made of a thin spherical cap of brass and having the required pattern in the form of circular holes 0.5 mm in diameter and straight or curved lines 0.5 mm in width. After diffraction by the mask the beam passes through an imaging optics unit comprising two germanium lenses which image the mark onto the workpiece to produce said selectable machining pattern thereon.

While the present invention has been particularly set forth in terms of specific embodiments thereof, it will be understood in view of the present disclosure, that numerous variations upon the invention are now enabled to those skilled in the art, which variations yet reside within the scope of the present invention. Accordingly, the invention is to be broadly construed and limited only by the scope and spirits of the claims now appended hereto.

I claim:

1. Laser micromachining apparatus capable of producing a particular machining pattern on a workpiece comprising:

a laser device for producing a laser beam;

a beam expander unit positioned to receive said laser beam and transform it into a beam of larger and substantially uniform cross-sectional area;

a mask device in the path of said laser beam after said beam expander unit, said mask device including a diffraction pattern corresponding to said particular machining pattern, said diffraction pattern including a plurality of different individual perforations;

converging lens means for focusing said laser beam and positioned adjacent said mask device in the path of said beam; and image optics means in the path of said laser beam after said converging lens means and mask device for imaging the whole of said diffraction pattern of said mask onto said workpiece, said converging lens means being a spherical lens superposing said diffraction pattern of said different individual perforations of said mask at the entrance pupil of said image optics means to provide a minimum size imaging unit for reproducing said diffraction pattern on said workpiece.

2. Laser micromachining apparatus according to claim 1 wherein the mask device is made of a thin spherical cap of metal having a curvature matching the incident wavefront of laser light and a center of curvature located in the entrance pupil of said optical imaging unit.

3. Laser micromachining apparatus according to claim 2 wherein the mask device is made of a thin spherical cap of brass having a radius of curvature of 75 cm, a thickness of 1 mm and a diameter of 6 cm.

4. Laser micromachining apparatus according to claim 1 in which said masking diffraction pattern formed by said perforations include circular holes 0.5 mm in diameter and straight or curved lines 0.5 mm in width.

5. Laser micromachining apparatus according to claim 1 in which said beam expander unit comprises cylindrical lenses or mirrors transforming the cross section of the laser beam to match the dimensions of the mask and providing a substantially uniform illumination over it.

6. Laser micromachining apparatus according to claim 1 including a protection device located between the imaging optics unit and the workpiece to protect said imaging optics unit from debris coming off the workpiece during a machining operation.

7. Laser micromachining apparatus according to claim 6 wherein a variable attenuator unit is located between said laser device and said beam expander unit to control the attenuation of the laser beam as it passes through the variable attenuator unit.

8. Laser micromachining apparatus according to claim 1 wherein means is provided to accurately position the workpiece along three cartesian axis.

9. Laser micromachining apparatus according to claim 1 wherein the sequence of laser pulses in the laser beam is controllable.

10. Laser micromachining apparatus according to claim 1 into which a large set of selectable masks providing readily interchangeable machining patterns is incorporated.

* * * * *